United States Patent [19]

Theimer

[11] Patent Number: 4,755,854

[45] Date of Patent: Jul. 5, 1988

[54] CONTACT PRINTER

[76] Inventor: Siegfried Theimer, Rohler Strasse 10, 6484 Birstein 6, Fed. Rep. of Germany

[21] Appl. No.: 32,579

[22] Filed: Apr. 1, 1987

[30] Foreign Application Priority Data

Apr. 1, 1986 [DE] Fed. Rep. of Germany ....... 3610863

[51] Int. Cl.$^4$ ............................................. G03B 27/20
[52] U.S. Cl. ....................................... 355/91; 355/99
[58] Field of Search ...................... 355/91, 94, 85, 87, 355/93, 99, 78

[56] References Cited

U.S. PATENT DOCUMENTS 4,437,759 3/1984 Mizukami et al. .................... 355/91

FOREIGN PATENT DOCUMENTS 3234515 4/1983 Fed. Rep. of Germany .

Primary Examiner—Richard A. Wintercorn
Attorney, Agent, or Firm—Foley & Lardner, Schwartz, Jeffery, Schwaab, Mack, Blumenthal & Evans

[57] ABSTRACT

A contact printer comprising a glass plate on which a rubber mat can be placed by unwinding the latter from a roll. The cylinder of the roll is mounted in a slide which can be moved along guide rails extending on both sides of the glass plate. The guide rails are mounted near a rear edge portion of the housing so as to be pivotable about a pivot axle.

12 Claims, 3 Drawing Sheets

CONTACT PRINTER

BACKGROUND OF THE INVENTION

1. Field of the Invention

The present invention relates generally to contact printers, and more particularly to contact printers having mechanisms for lowering a slide. A type of contact printer is known from German Offenlegungsschrift No. 3,234,515, wherein its slide can be lowered in its wound-up condition. Consequently, the printer is easier and more convenient to operate, because the operator may stand in front of the front edge of the housing and has only to bend forwardly over the glass plate to lay the printing copies in place. The printing copies commonly comprise a master copy (usually a film negative) and then a photographic element (for example, an unexposed offset printing plate). The slide, if it were in a raised position, would impede this manner of loading the contact printer.

However, a disadvantage of the above known design is that the kinematics of the movement of the slide is complicated. The slide is fastened on both sides to shifting rods which extend downwardly and which are guided vertically in sliding pieces which are themselves displaceable along the guide rails. An end of each shifting rod is connected to a link of an endless chain which revolves over a plurality of deflecting wheels so that the chain has both an approximately horizontal strand and a vertical strand.

When the connecting chain link moves in the horizontal section, the slide is moved horizontally at constant height over the glass plate, and when the connecting chain link moves downwardly along the vertical strand, the horizontal movement of the slide ceases and the slide moves only downwardly by a corresponding distance.

The double cross-guides and the chain kinematics make this known design complicated and maintenance-intensive.

SUMMARY OF THE INVENTION

The object of the present invention is, therefore, to provide a contact printer which includes a mechanism for lowering the slide that is simple and durable, thus ensuring high operating reliability, even under rough treatment, and a long service life.

These and other objects are achieved by the present invention which provides a contact printer comprising a housing, a slide arrangement for unwinding a flexible mat upon an upper portion of the housing and an arrangement for lowering the mat in its wound condition below the level of the upper housing portion. The slide arrangement includes guides for guiding the slide along a path between a first location forward of a forward edge portion of the housing and a second location adjacent a rear edge portion of the housing. The mat is in a wound condition at the first location. The arrangement for lowering the mat includes a pivot arrangement for pivoting the guide about a horizontal axis located adjacent the rear edge portion of the housing.

Preferably, the pivot arrangement includes pivot arms disposed along opposite sides of the housing, a pivotal connection between the pivot arms and the rear edge portion of the housing and a cam operatively connected with the pivot arms for causing the pivot arms to pivot. the guides of the slide arrangement are attached to the pivot arms.

BRIEF DESCRIPTION OF THE DRAWINGS

The invention is further explained below with a description of a preferred embodiment, with reference to the accompanying drawings, wherein.

DETAILED DESCRIPTION OF THE PREFERRED EMBODIMENTS

Figure 1:
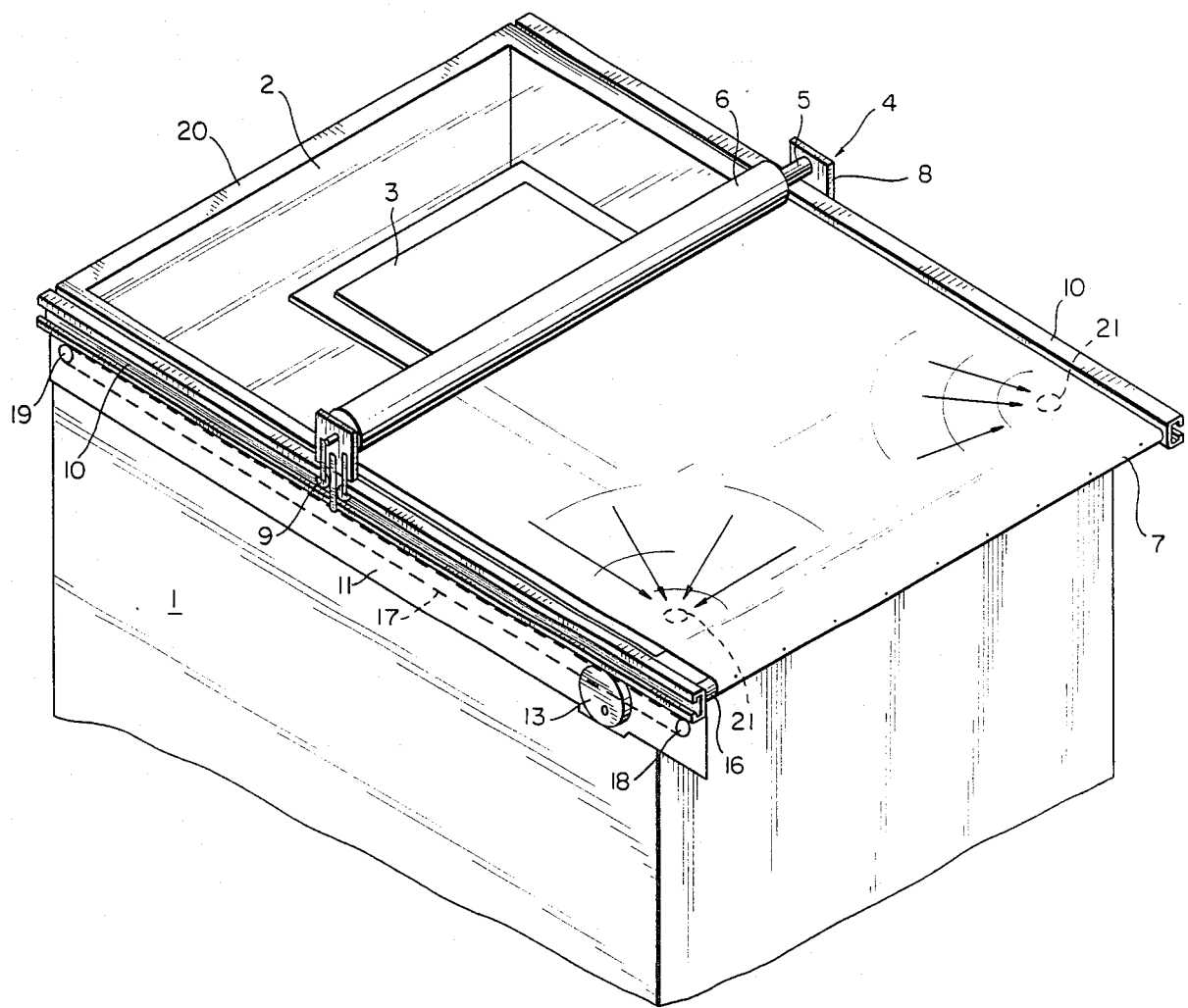
FIG. 1 is a perspective view of the contact printer constructed in accordance with a preferred embodiment of the present invention.

The preferred embodiment of the present invention is a contact printer whcih includes a housing 1, a light source 1a contained within the housing and a glass plate 2. The glass plate 2 supports printing copies 3 that are laid thereupon. The light source shines upwardly toward the glass plate 2 to expose the printing copies 3. The upper member of the printing copies 3 usually comprises photographic material, such as an offset printing plate, which is exposed by light passing through a lower master copy.

A slide 4 is movable over the glass plate 2. The slide 4 carries a rubber mat 7 which can be wound onto a cylinder 5 to form a roll 6.

The roll cylinder 5 is mounted in slide cheeks 8 which are arranged on both sides of the glass plate 2. Each slide cheek 8 is displaceable with the assistance of two, tandemly arranged slide rollers 9 which are movable along a guide rail 10 of U-shaped profile. This arrangement maintains the vertical alignment of the slide cheeks 8 during their displacement.

Each guide rail 10 is fastened to a pivot arm 11 which is pivotable about a pivot axle 12 located near a rear edge of the housing 1. Each pivot arm 11 near its front edge has a shape resembling a U-shaped profile, in which a cam 13 is located. The cam 13 is connected by an axle 15 to a motor 14. In the preferred embodiment, the cam 13 is circular and the motor 14 is fixed, with the axle 15 being connected eccentrically to the cam 13. During its rotation, the cam 13 causes the front end of the pvito arm 11 to move up and down between an upper and a lower end position. The web portion of the pivot arm 11 includes an approximately vertical, arcuate slot 11a through which the cam axle 15 extends. The slot 11a accommodates the pivoting movement of the pivot arm 11 relative to the pin 14.

One end of the rubber mat 7 is fastened to a fixed holding bar 16 which extends between the front edges of the guide rail 11. By this arrangement, when the slide 4 is displaced away from the holding bar 16, the roll 6 is unwound and the rubber mat 7 is stretched over the glass plate 2 and the printing copies 3 on the glass plate 2. When the slide 4 is retracted by moving it toward the holding bar 16, the mat is once again wound onto the cylinder 5 to form the roll 6. For this purpose, the roll cylinder 5 contains a suitable torsion spring or the like which subjects the cylinder 5 to a torque which tends to wind up the mat 7.

The slides 4 are driven by endless drive chains 17 which run under the guide rails 19 on both sides of the contact printer. The drive chains are guided by a front deflecting wheel 18 and a rear deflecting wheel 19. The axle of the rear deflecting wheel 19 can serve as the pivot axle 12 of the pivot arm 11. One of the pairs of deflecting wheels is provided with a motor drive, in order to move the slide 4 connected to the upper strand of each drive chain 17 to and fro between its end positions.

The glass plate 2 is framed by a sealing lip 20, on which the edges of the rubber mat 2 come to rest in the extended state. Within the region enclosed in this way are suction orifices 21 for evacuating the space under the extended rubber mat.

The roll cylinder 5 is mounted in the slide 4 by a spring suspension 22 which urges the roll cylinder 5 downwardly toward the glass plate 2.

Figure 2:
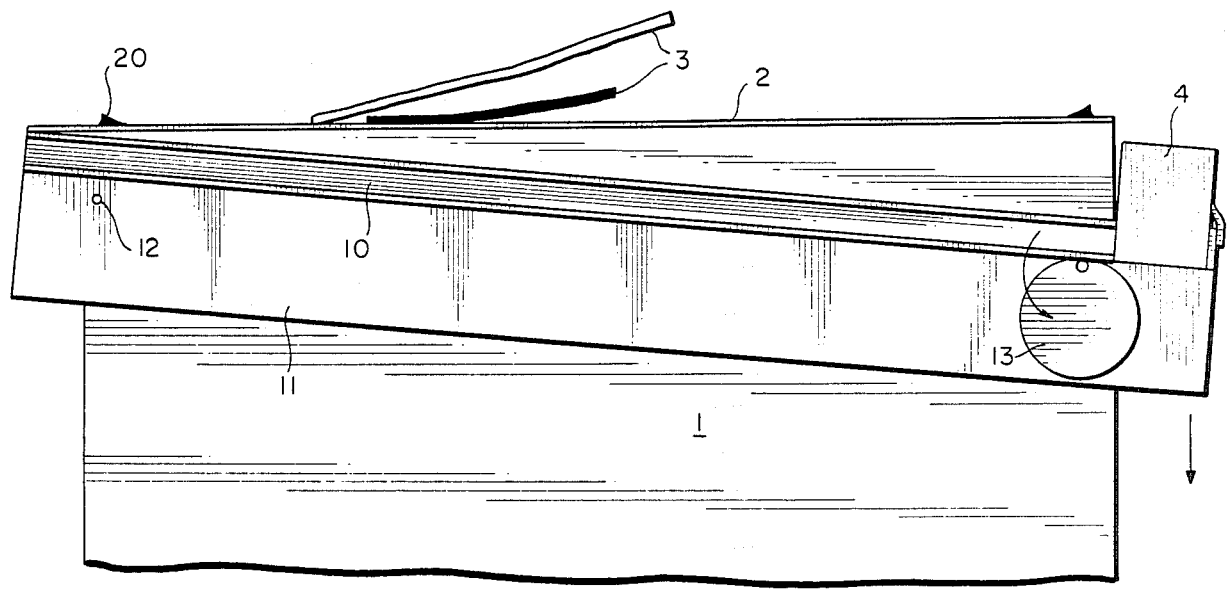
FIG. 2 is a side view of the contact printer of FIG. 1 during the operation of laying on printing copies.

The described contact printer operates in the following manner:

First, cams 13 are activated to lower the slides 4 while the slides 4 remain adjacent the front ends of the pivot arms 11, as shown in FIG. 2. An operator, who may stand in front of the front edge of the housing, lays the printing copies 3 onto the glass plate 2.

Figure 3:
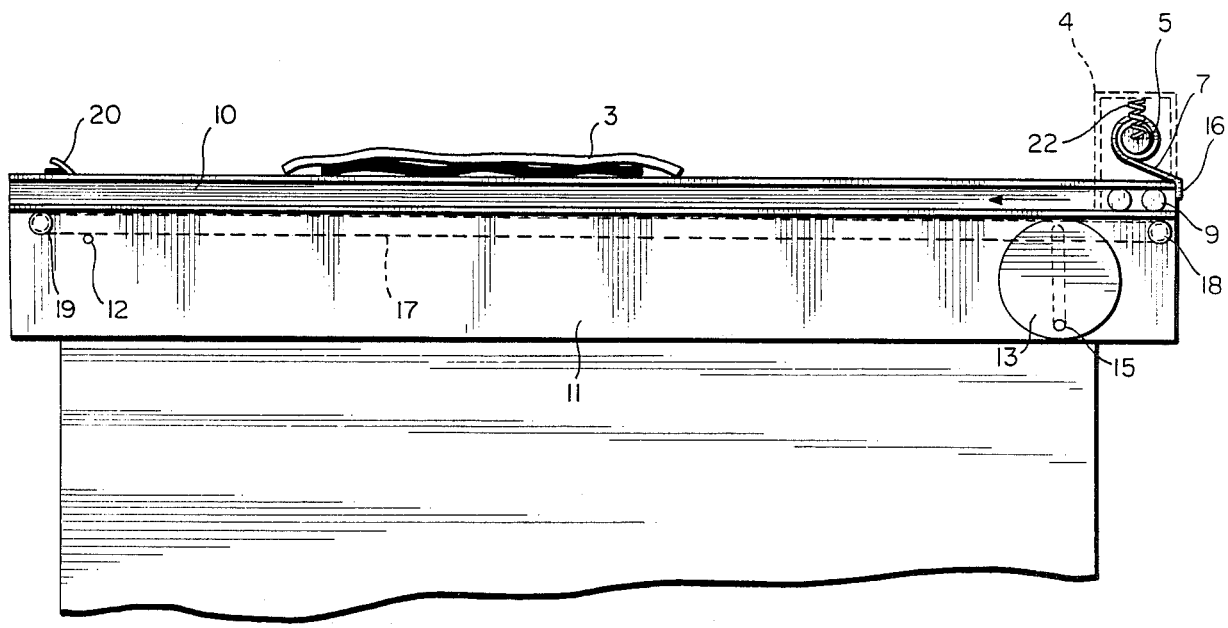
FIG. 3 is a side view of the contact printer of FIG. 1 after the mat slide has been swung upwardly.

A program control unit 14b is then switched on to first cause the cams 13 to rotate until the pivoting arms 11 are pivoted upwardly to their raised end positions. The roll 6 is now located above the glass plate, as can be seen in FIG. 3.

Figure 4:
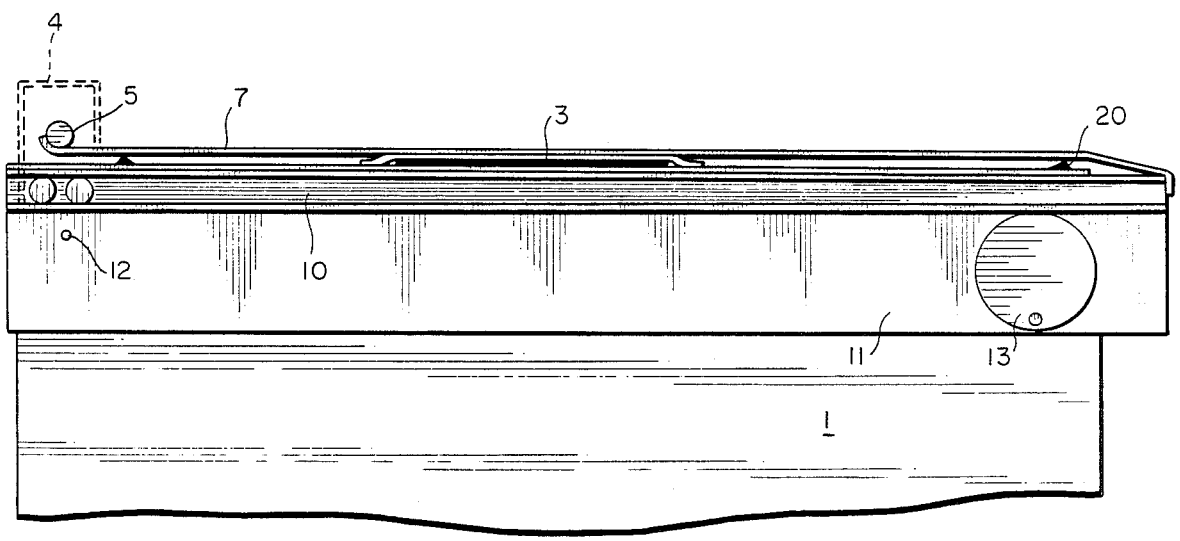
FIG. 4 is a side view of the contact printer of FIG. 1 after the mat slide has been extended.
Figure 5:
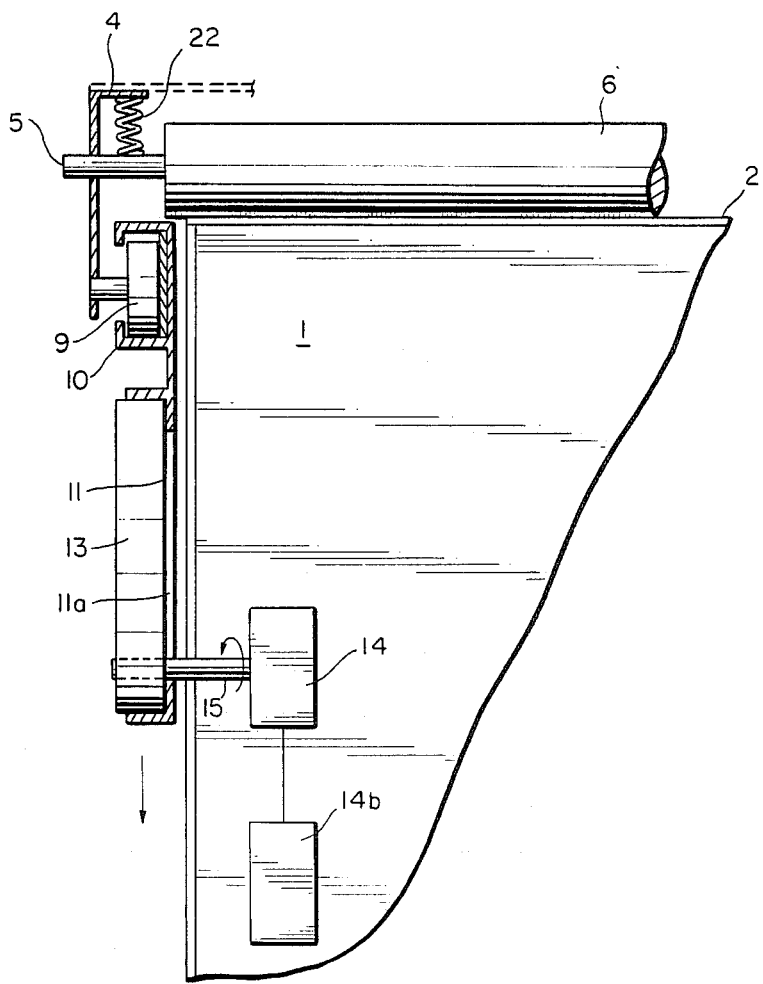
FIG. 5 is an end view of the contact printer of FIG. 1, partially in section.

Subsequently, the drive of the chains 17 is activated so that the slide 4 is displaced. In FIG. 1, the slide 4 has progressed approximately half-way in its travel, and in FIG. 4, the slide has arrived at its extended end position.

A vacuum is now created via the suction orifices 21 between the glass plate 2 and the rubber mat 7, so that the atmospheric pressure urges the rubber mat 7 and the interposed printing copies 3 against the glass plate 2. The pressing action is enhanced by the fact that during the extension of the slide, the spring-loaded mat roll 6 smooths the printing copies 3 flat and essentially eliminates any air pockets present between them. Consequently, the printing copies 3 are now brought into full, intimate contact with one another and with the glass plate 2 by the pressure exerted as a result of the evacuation.

Exposure is performed and subsequently the vacuum is relieved and the slide is retracted to its position adjacent the front ends of the pivot arms 10, the rubber mat 7 being wound up again. The slide, when in its front end position, is lowered again as the pivot arms 11 are pivoted downwardly as a result of the appropriate actuation of the cams 13, so that the operator can now easily remove the printing copies 3.

It would be apparent to one who has become familiar with the present disclosure that the actual elements mentioned above can be replaced by equivalent elements, for example, the glass plate can also be a plate made of another transparent material, or the rubber mat can also be a mat made of another suitable flexible material.

Thus, it is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. A contact printer comprising:
    a housing including a light transmissive upper portion, a forward edge portion and a rear edge portion;
    means for unwinding a flexible mat upon said upper housing portion including a slide and means for guiding said slide along a path between a first location forward of said forward edge portion and a second location adjacent said rear edge portion, said mat being in a wound condition at said first location; and
    means for lowering said mat in its wound condition below a level of said upper housing portion including means for pivoting said guide means about a horizontal axis located adjacent said rear edge portion, wherein said pivoting means includes pivot arms disposed along sides of said housing, a pivotal connection between said pivot arms and said housing adjacent said rear edge portion and means operatively connected with said pivot arms for causing said pivot arms to pivot, said guide means including members attached to said pivot arms.

2. The contact printer as claimed in claim 1, wherein said means operatively connected with said pivot arms for causing said pivot arms to pivot comprises a cam means.

3. A contact printer for exposing printing copies, comprising:
    a housing having a rear edge portion;
    a light transmissive plate member adapted to receive printing copies, said plate member having a front edge portion;
    guide members extending along both sides of the plate member;
    a slide movable along said guide members, said slide being movable forwardly to a position beyond said front edge of said plate member, said slide including a roll cylinder;
    a flexible mat which is wound upon said roll cylinder when said slide is at said forward position; and
    pivotal connection means between said guide members and said housing for lowering said slide and said flexible mat in a rolled condition to a level below that of said plate member, said pivotal connection including a pivot located adjacent said rere edge portion.

4. The contact printer as claimed in claim 3, wherein the guide members are driven to pivot by cams which engage front end portions of the guide members.

5. The contact printer as claimed in claim 3, wherein an endless drive chain is located adjacent each of the guide rails, the slide having end portions connected with said drive chains.

6. The contact pirnter as claimed in claim 5, wherein the guide members are driven to pivot by cams which engage front end portions of the guide members.

7. The contact printer as claimed in claim 6, wherein said pivotal connection means includes pivot arms, said guide members being fastened to said pivoting arms, said pivot arms having portions of U-shaped cross-section which receive said cams.

8. The contact printer as claimed in claim 7, wherein said slide includes cheeks and said roll cylinder is mounted to said cheeks, each cheek being provided with at least two tandemly arranged slide rollers which engage the same guide member.

9. The contact printer as claimed in claim 8, wherein the slide includes means for biasing said roll cylinder toward the plate member.

10. The contact printer as claimed in claim 3, wherein said slide includes cheeks and said roll cylinder is mounted to said cheeks, each cheek being provided with at least two tandemly arranged slide rollers which engage the same guide member.

11. The contact printer as claimed in claim 3, wherein the slide includes means for biasing said roll cylinder toward the plate member.

12. A contact printer for exposing printing copies laid on a light transmissive plate of the contact printer, said contact printer including a flexible mat which can be unwound from a roll cylinder which is mounted in a slide, said slide being movable beyond a front edge of the light-transmissive plate in cooperation with guide rails extending along both sides of the light-transmissive plate, said mat in a wound-up position lowerable to a level below the plate, said guide rails being articulated on the housing near a rear edge portion of said housing so that said guide rails are pivotable about a pivot axle and the slide in the wound-up condition can be lowered by pivoting the guide rails downwardly.

* * * * *